US010480462B2

(12) United States Patent
Metzger

(10) Patent No.: US 10,480,462 B2
(45) Date of Patent: Nov. 19, 2019

(54) AIR FILTER HOUSING AND AIR FILTER FOR AN AIR INTAKE CONDUIT OF AN INTERNAL COMBUSTION ENGINE

(71) Applicant: MANN+HUMMEL GMBH, Ludwigsburg (DE)

(72) Inventor: Michael Metzger, Waiblingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 40 days.

(21) Appl. No.: 15/448,665

(22) Filed: Mar. 3, 2017

(65) Prior Publication Data

US 2017/0175685 A1    Jun. 22, 2017

Related U.S. Application Data

(63) Continuation of application No. PCT/EP2015/070106, filed on Sep. 3, 2015.

(30) Foreign Application Priority Data

Sep. 4, 2014    (DE) .................. 10 2014 012 881

(51) Int. Cl.
*F02M 35/024*    (2006.01)
*B01D 46/00*    (2006.01)
(Continued)

(52) U.S. Cl.
CPC ... *F02M 35/02416* (2013.01); *B01D 46/0005* (2013.01); *B01D 46/10* (2013.01);
(Continued)

(58) Field of Classification Search
CPC ....... F02M 35/02416; F02M 35/02491; F02M 35/0203; B01D 46/10; B01D 46/0005;
(Continued)

(56) References Cited

U.S. PATENT DOCUMENTS 5,275,636 A    1/1994 Dudley et al.
6,293,984 B1    9/2001 Oda et al.
(Continued)

FOREIGN PATENT DOCUMENTS

CN    1360515 A    7/2002
CN    1517542 A    8/2004
(Continued)

*Primary Examiner* — Jacob M Amick
*Assistant Examiner* — Charles Brauch
(74) *Attorney, Agent, or Firm* — James Hasselbeck

(57) ABSTRACT

An air filter housing for intake air of an internal combustion engine has a housing pot having a housing wall and a receiving opening. The receiving opening is delimited circumferentially by a free rim section of the housing wall. Through the receiving opening, an air filter element with circumferential radial sealing element is insertable into the housing pot and a housing cover closes off the housing pot. The radial sealing element, when the air filter element is inserted into the housing pot, projects radially outwardly past the free rim section and seals housing cover and housing pot relative to each other. The housing pot is provided externally with a stop that limits axial deformation of the radial sealing element relative to the free rim section of the housing wall when the housing cover is placed onto the housing pot.

11 Claims, 3 Drawing Sheets

(51) Int. Cl.
*F02M 35/02* (2006.01)
*B01D 46/10* (2006.01)

(52) U.S. Cl.
CPC .. *F02M 35/0203* (2013.01); *F02M 35/02491* (2013.01); *B01D 2265/027* (2013.01); *B01D 2271/027* (2013.01); *B01D 2279/60* (2013.01)

(58) Field of Classification Search
CPC ........ B01D 2265/027; B01D 2271/027; B01D 2279/60
See application file for complete search history.

(56) References Cited

U.S. PATENT DOCUMENTS

| | | |
|---|---|---|
| 9,284,925 B2 | 3/2016 | Wagner et al. |
| 2005/0229561 A1* | 10/2005 | Nepsund ............ B01D 46/0004 55/481 |
| 2011/0247582 A1* | 10/2011 | Blossey ............. B01D 46/0024 123/198 E |
| 2011/0308214 A1 | 12/2011 | Jessberger et al. |
| 2012/0180443 A1* | 7/2012 | Engelland .......... B01D 46/0004 55/357 |
| 2013/0239531 A1 | 9/2013 | Koda |

FOREIGN PATENT DOCUMENTS

| | | |
|---|---|---|
| CN | 1658946 A | 8/2005 |
| CN | 201799186 U | 4/2011 |
| CN | 203548015 U | 4/2014 |
| DE | 102009008450 A1 | 8/2010 |
| EP | 1354617 A1 | 10/2003 |
| WO | 03048557 A1 | 6/2003 |
| WO | 2012045583 A1 | 4/2012 |
| WO | 2013104792 A1 | 7/2013 |

* cited by examiner

AIR FILTER HOUSING AND AIR FILTER FOR AN AIR INTAKE CONDUIT OF AN INTERNAL COMBUSTION ENGINE

CROSS-REFERENCE TO RELATED APPLICATIONS

This application is a continuation application of international application No. PCT/EP2015/070106 having an international filing date of 3 Sep. 2015 and designating the United States, the international application claiming a priority date of 4 Sep. 2014, based on prior filed German patent application No. 10 2014 012 881.4, the entire contents of the aforesaid international application and the aforesaid German patent application being incorporated herein by reference.

BACKGROUND OF THE INVENTION

The invention concerns an air filter housing and an air filter for the air intake conduit of an internal combustion engine of a motor vehicle, comprising a housing pot with a receiving opening for insertion of an air filter element, provided with a circumferentially extending elastomeric radial sealing element, into the housing pot and further comprising a housing cover that can be placed along a mounting axis onto the housing pot. The receiving opening of the housing pot is circumferentially delimited by a free rim section of a housing wall of the housing pot; the radial sealing element of the filter element inserted into the housing pot is extending past the free rim section in outward direction in order to seal the housing cover and the housing pot relative to each other.

Air filters for the air intake conduit of an internal combustion engine are used in particular in motor vehicles in order to filter from the air carbon-particulate matter, pollen, particulates, and other particles contained in the ambient air so that these particles cannot reach the combustion chamber of the motor. A premature wear and damages, for example, due to scratch formation on the pistons or defects of electronic components, can be avoided by an effective filtration of the intake air.

According to one type of construction, the employed air filters comprise an air filter housing of the aforementioned kind. For assembling the air filter, the air filter element in practice is usually inserted by hand into the housing pot of the air filter until the air filter element contacts by means of the circumferentially extending radial sealing element the free rim of the housing wall of the housing pot. The housing cover is subsequently placed onto the housing pot, in general assisted by automation.

In this context, due to the short cycle times required by cost considerations, the housing cover is moved at high movement speed along the mounting axis relative to the housing pot. The radial sealing element or its sealing lip has with regard to the opening cross-section of the housing cover an intended relative oversize in order to sealingly rest in the assembled position on the housing cover as well as on the free rim section of the housing pot with sufficiently great contact pressure. When placing the housing cover onto the housing pot, the sealing lip of the radial sealing element is therefore often excessively greatly deformed by the housing cover in axial direction. The radial sealing element may become damaged thereby. The sealing lip, for example, can tear or become notched by the free rim section of the housing wall of the housing pot. This risk exists in particular in case of a polygonal shape of the air filter housing and thus of the receiving opening of the housing pot as well as of the correspondingly configured radial sealing element. In practice, the use of lubricants, by means of which the friction resistance or gliding resistance between the housing cover and the sealing lip can be reduced, has been found to be too complex and too expensive, not least because of the required chemically inert properties of the lubricant.

Object of the invention is therefore to provide an air filter housing of the aforementioned kind as well as an air filter in which the risk of excessive loading of the radial sealing element of the air filter element at the time of placing the housing cover onto the housing pot can be reduced in an inexpensive and reliable way.

SUMMARY OF THE INVENTION

The object concerning the air filter housing is solved by an air filter housing of the aforementioned kind, comprising:
a housing pot with a receiving opening for insertion of an air filter element, provided with a circumferentially extending elastomeric radial sealing element, into the housing pot, and
a housing cover which can be placed along a mounting axis onto the housing pot,
wherein the receiving opening of the housing pot is delimited circumferentially by a free rim section of a housing wall of the housing pot, past which the radial sealing element of the air filter element inserted into the housing pot projects in radial direction and outward direction in order to seal the housing cover and the housing pot relative to each other,
wherein the housing pot comprises on the exterior at least one stop means for the radial sealing element of the air filter element by means of which, when placing the housing cover onto the housing pot, an axially oriented deformation of the radial sealing element relative to the free rim section of the housing wall is limited.

The object is solved for the air filter of the aforementioned kind in accordance with the invention in that the air filter comprises an air filter housing according to the invention and an air filter element arranged in the air filter housing and comprising a circumferentially extending elastomeric radial sealing element that is extending into a sealing gap arranged between the housing pot and the housing cover.

In the air filter housing according to the invention, the housing pot comprises at its exterior side at least one stop means for the radial sealing element of the air filter element by means of which, when placing the housing cover onto the housing pot, an axially oriented deformation or movement of the radial sealing element relative to the free rim section is limited. Due to the stop means, an excessive stretching of the sealing lip as a result of frictional entrainment of the sealing lip by the housing cover during its mounting on the housing pot can thus be avoided in a constructively simple and inexpensive way. The spacing of the stop means from the free rim of the housing pot is preferably matched to a maximum permissible total length of the radial sealing section extending past the free rim section. The total length of this section corresponds to its initial length plus its maximally permissible stretching.

With regard to manufacturing technological considerations, the stop means is preferably formed integrally on the housing pot. In this way, the housing pot can be produced in a single manufacturing step together with the stop means, for example, as an injection molded part. Production errors when fastening the stop means on the housing pot can therefore be substantially excluded. The housing pot and/or the housing cover of the air filter housing can be formed in particular of a thermoplastic material.

The air filter housing and thus also the air filter element to be arranged therein often must be constructed as a polygon in order to be able to fully utilize the available installation space within an engine compartment of a motor vehicle. In this case, the opening of the housing pot, through which the air filter element is inserted into the housing pot, has usually also a polygonal shape. For an effective axial support of the corner area of the radial sealing element that is particularly at risk, the stop means, in accordance with the invention, is therefore advantageously associated with a housing corner or a corner area of the housing pot. The stop means can extend, for example, in circumferential direction about the housing corner of the housing pot.

With regard to constructive as well as manufacturing technological aspects, the stop means is preferably formed by a housing wall projection which extends laterally away from the housing pot. Such a housing wall projection requires only a minimal additional material use and moreover can contribute an additional reinforcing action of the housing pot.

In order for the radial sealing element not to become damaged during mounting of the housing cover and when impacting against the stop means, the stop means or the housing wall projection is advantageously embodied to be rounded.

The stop means can advantageously comprise a web-shaped or rib-shaped configuration. This provides, in particular in case of a housing pot that is produced by an injection molding process, the advantage of an unchanged simple removal of the produced housing pot from the injection molding tool. Moreover, in this way a reliable connection (because it is axially elongate) of the stop means on the housing pot can be ensured. Tearing off of the stop means from the housing pot can therefore be reliably counteracted.

According to the invention, the housing pot can be provided with several of the aforementioned stop means. In this way, the risk of damaging the radial sealing element can be further reduced. The stop means in this context are preferably associated with at least one or several housing corners of the housing pot and are arranged spaced apart from each other in circumferential direction of the housing pot. The corner areas as the most sensitive areas of the radial sealing element can therefore be protected from damage during mounting of the housing cover on the housing pot.

For an even further extended protection of the radial sealing element from damage, the stop means can also be arranged so as to be distributed about the entire circumference of the housing pot. In the latter case, the stop means are arranged preferably less far spaced apart from each other in the housing corners of the housing pot than along the housing wall sections of the housing pot arranged between the corner areas.

The air filter according to the invention for an air intake conduit of an internal combustion engine of a motor vehicle comprises an air filter housing as explained above and an air filter element arranged in the air filter housing and comprising a circumferentially extending radial sealing element that extends into a sealing gap which is arranged between the housing pot and the housing cover.

The invention will be explained in more detail in the following with the aid of an embodiment illustrated in the drawing.

DESCRIPTION OF PREFERRED EMBODIMENTS

Figure 1:
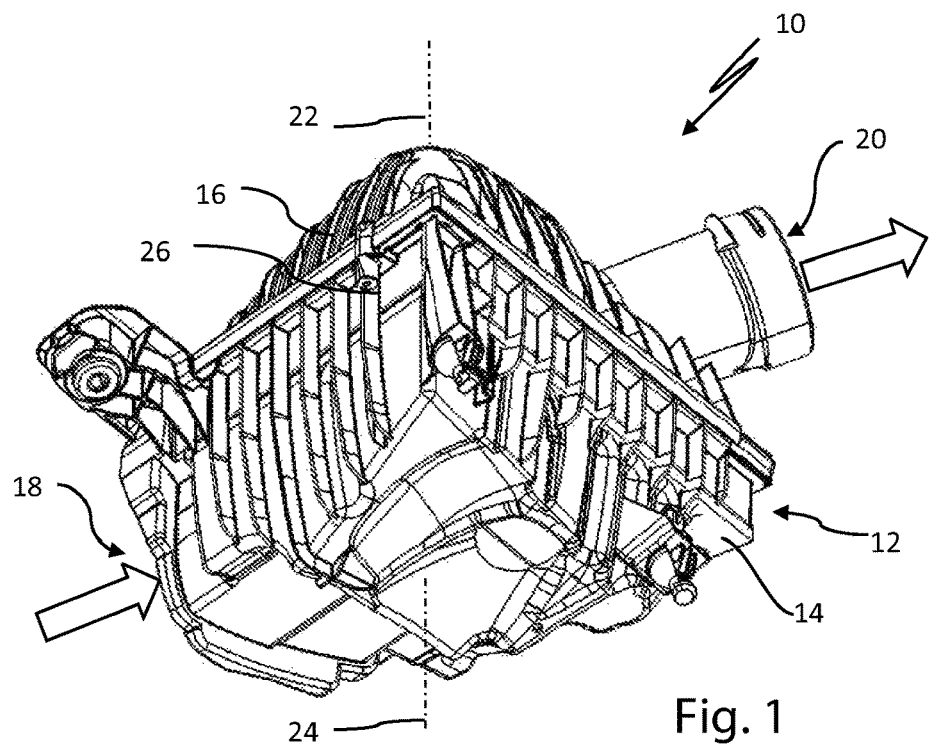
FIG. 1 shows in a perspective view an air filter with an air filter housing that comprises a housing pot and a housing cover arranged thereon, wherein in the air filter an exchangeable air filter element is arranged.

FIG. 1 shows an air filter 10 for an air intake conduit, not shown in detail, of an internal combustion engine of a motor vehicle in a perspective view. The air filter 10 comprises an air filter housing 12 with an air filter element arranged therein and hidden as a result of the illustration. The filter housing 12 comprises a housing pot 14 and a housing cover 16 arranged thereon for closing off the housing pot 14. An air inlet 18 for the air to be purified and an air outlet 20 for the air purified by the air filter element are shown. For mounting on the housing pot 14, the housing cover 16 can be placed onto the housing pot 14 along a mounting axis 22 that coincides with the housing axis 24 of the housing pot 14. In its mounted position on the housing pot 14, the housing cover 16 engages across a housing wall 26 of the housing pot 14 on the exterior. The housing cover 16 can be screwed to the housing pot 14 or can be secured by other fastening means, in particular by means of quick-connect closure means or the like, on the housing pot 14. The housing pot 14 and the housing cover 16 each have a polygonal, here a quadrangular, shape. The housing pot 14 as well as the housing cover 16 are comprised of a thermoplastic material, respectively, and are embodied in the present case as injection molded parts.

Figure 2:
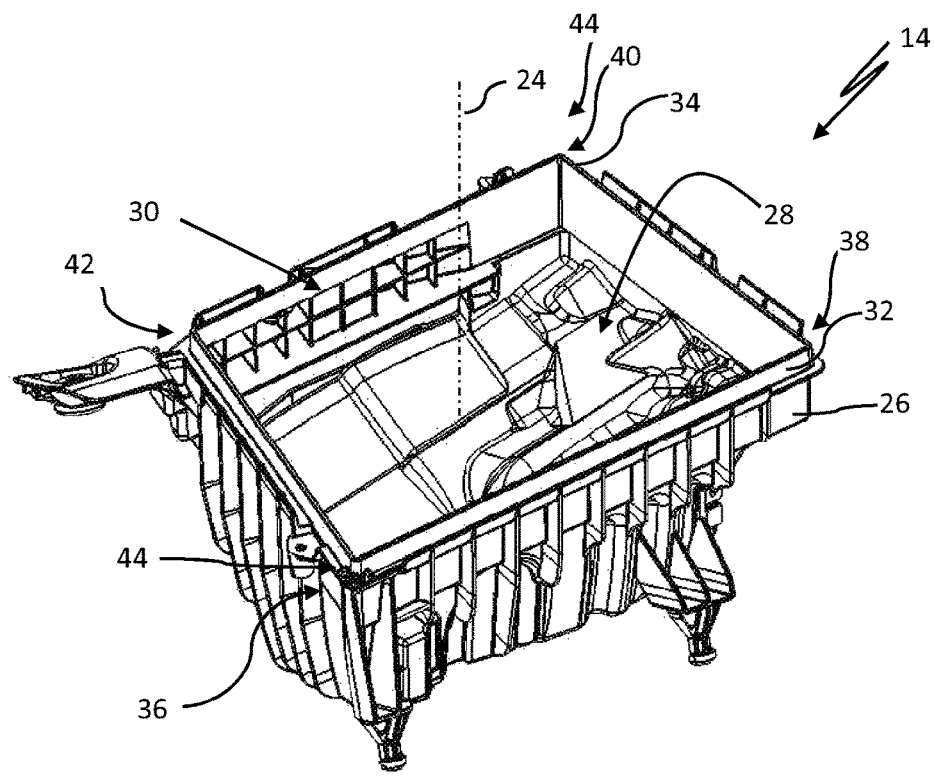
FIG. 2 shows the housing pot of the air filter housing of FIG. 1 in a perspective view.

In FIG. 2, the housing pot 14 of the air filter 10 of FIG. 1 is shown alone in a perspective view. The housing pot 14 comprises an air filter element receptacle 28 with a receiving opening 30 for insertion of the air filter element into the air filter element receptacle 28 of the housing pot 14. The receiving opening 30 of the housing pot 14 is delimited circumferentially by a circumferentially extending free rim section 32 of the housing wall 26 of the housing pot 14. A free rim 34 of the housing wall 26 is illustrated.

The housing pot 14 comprises in the illustrated embodiment four housing corners 36, 38, 40, 42. The free rim section 32 of the housing wall 26 of the housing pot 14 serves for axial support of a radial sealing element of the air filter element to be arranged in the housing pot 14. Relative to the inner opening width of the housing cover, the radial sealing element comprises mandatorily a radial oversize in order to contact in a sealing manner externally the housing cover 16 and internally the free rim section 32 of the housing pot 14 with a sufficiently great contact pressure when the housing cover 16 is mounted.

When placing the housing cover 16 onto the housing pot 14, the radial sealing element is resting therefore with friction on the housing cover 16 and is at least sectionwise entrained by the housing cover 16 along the mounting axis 22. This may cause, depending on the friction existing between the radial sealing element and the housing cover 16, such a great deformation, in particular stretching, of the radial sealing element, at least about a circumferential section of the radial sealing element, relative to the free rim section 32 of the housing wall 26 of the housing pot 14 that the radial sealing element might become damaged. This is the case in particular in the support area of the radial sealing element at the free rim section 32 of the housing wall 26. The housing pot 14 has therefore on the exterior side, here in an exemplary fashion in the area of its two housing corners 36, 40 that are arranged opposite each other, several stop means (stop elements) 44 for the radial sealing element of the air filter element by means of which an axially oriented deformation of the radial sealing element relative to the free rim section 32 is limited when placing the housing cover 16 onto the housing pot 14.

Figure 3:
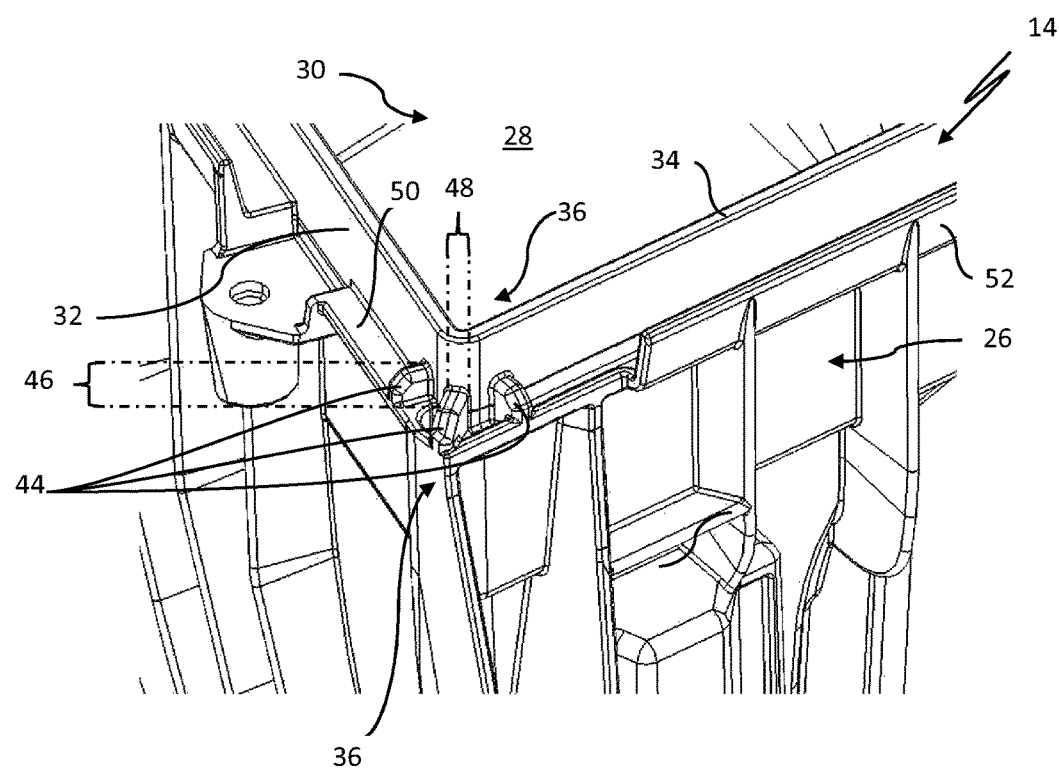
FIG. 3 shows the housing pot of FIG. 2 in a perspective detail illustration.

FIG. 3 shows in an exemplary fashion the housing corner 36 of the housing pot 14 shown in FIG. 2 in a perspective detail view. In the area of the housing corner 36, a total of three stop means (stop elements) 44 are arranged. The stop means 44 are integrally formed on the housing pot 14 and are laterally projecting away from the housing wall 26 of the housing pot 14 in the form of housing wall projections. The stop means are arranged so as to be axially spaced apart from the free rim 34 of the free rim section 32 of the housing wall 26. The stop means 44, as shown in FIG. 3, can be designed to be web-shaped or rib-shaped, i.e., the stop means 44 each have an axial height 46 that is greater than their width 48. Moreover, the base of the stop means 44 are supported or integrally formed on a circumferentially extending collar 50 of the housing pot 14, respectively, whose angled free rim area 52 serves as an axial mounting stop for the housing cover 16. As a whole, the stop means 44 have in this way in axial direction a high load bearing capacity. In axial direction, the stop means 44 is arranged between the free rim 34 of the housing wall 26 and the collar 50 of the housing wall 26 of the housing pot 14.

The stop means 44 each have a rounded shape in order to avoid shearing damages on the radial sealing element when impacting on the respective stop means. Since the stop means 44 are spaced apart from each other, the radial sealing element, as needed, can slide to a limited extent between the illustrated stop means 44 so that an undulation of the radial sealing element in radial direction and thus a disruption of the sealing function of the radial sealing element can be avoided. The stop means 44 can also be arranged in the area of the other housing corners of the housing pot 14. In an embodiment which is not illustrated in detail in the drawing, the stop means 44 are arranged so as to be distributed about the entire circumference of the housing pot 14, preferably at a regular spacing relative to each other.

Figure 4:
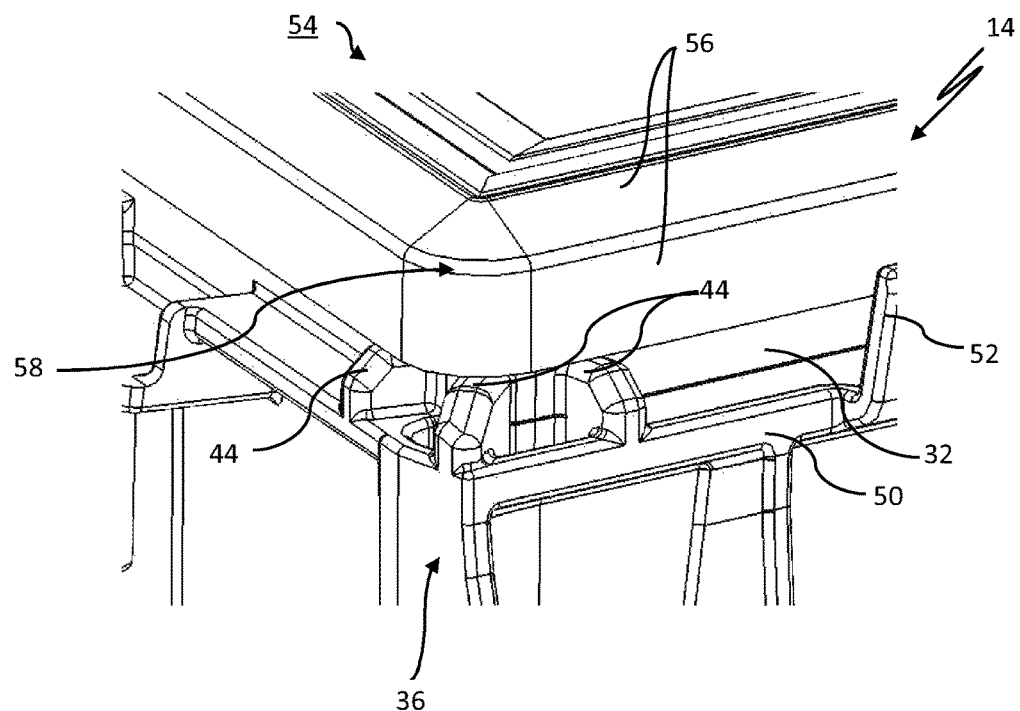
FIG. 4 shows the housing pot of FIG. 2 with inserted air filter element in a perspective detail illustration.

In FIG. 4, the housing corner 36 (FIG. 2) of the housing pot 14 is shown together with the air filter element 54 inserted into the housing pot 14. The air filter element 54 comprises a circumferentially extending radial sealing element 56. The radial sealing element 56 is positioned with its corner area 58 on the stop means 44 and is supported by the stop means 44 on the housing pot 14 in axial direction.

Figure 5:
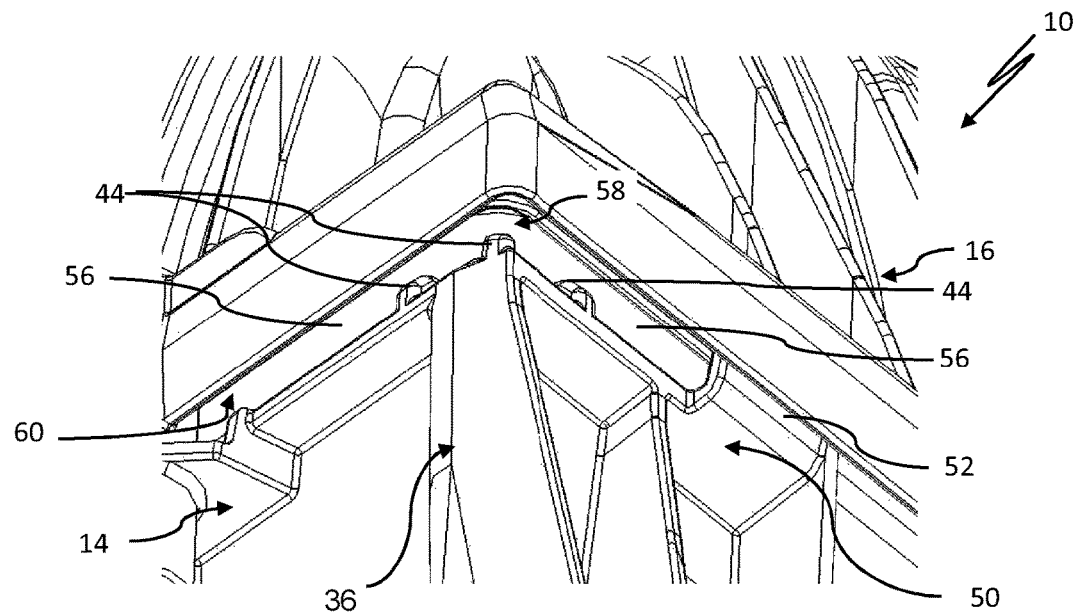
FIG. 5 shows the air filter of FIG. 1 in a perspective detail illustration.

FIG. 5 shows a detail of the air filter 10 of FIG. 1 in the area of the housing corner 36 (FIG. 2). The housing pot 14 in the area of the free rim section 32 of its housing wall 26 is surrounded on the exterior by the housing cover 16 arranged in its mounted position. The radial sealing element 56 of the air filter element 54 arranged in the air filter housing 12 is resting on the housing pot 14 and on the housing cover 16 in a circumferentially sealing way and is supported axially in the illustrated corner area 36 on the stop means (stop elements) 44.

Figure 6:
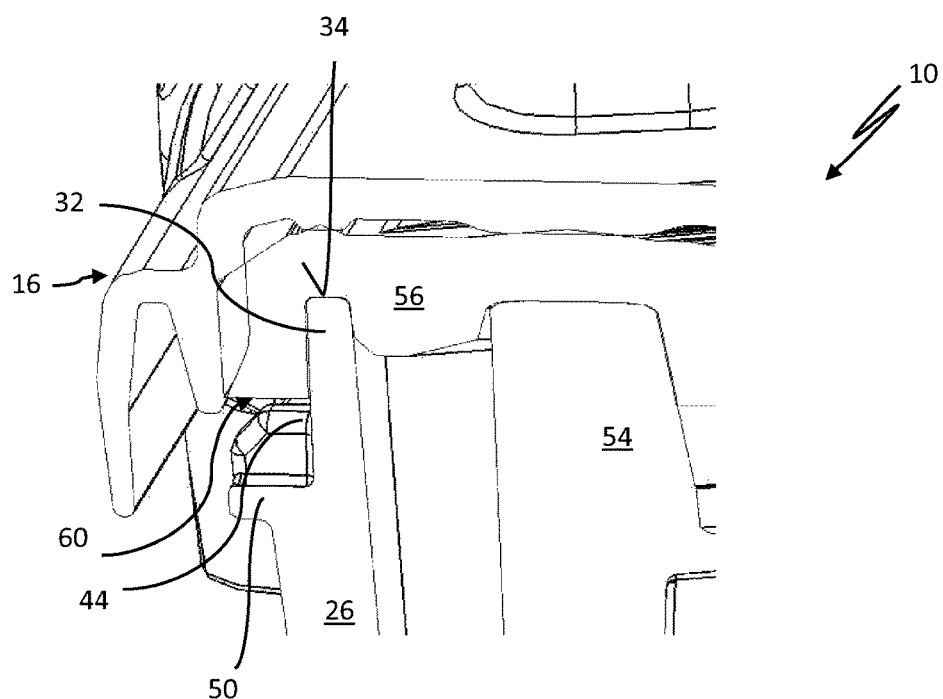
FIG. 6 shows the air filter of FIG. 1 in a detail section illustration.

As shown in the illustrated section view of FIG. 6 of the assembled air filter 10, the radial sealing element 56 of the air filter element 54 is resting on the free rim 34 of the housing wall 26 of the housing pot 14 and is forced by the housing cover 16 axially against the free rim 34. The radial sealing element 56 is held in this case between the housing cover 16 and the housing pot 14 with axial press fit. The radial sealing element 56 extends laterally past the free rim 34 of the housing wall 26 and projects into a sealing gap 60 which is formed between the housing cover 16 and the housing pot 14. The radial sealing element 56 in the sealing gap 60 between the housing cover 16 and the housing pot 14 is held by press fit acting in radial direction relative to the housing axis (FIGS. 1 and 2) of the housing pot 14 and is axially supported on the stop means 44, as is shown in FIG. 6 with the example of stop means 44.

What is claimed is:

1. An air filter housing for an intake air conduit of an internal combustion engine of a motor vehicle, the air filter housing comprising:
   a housing pot comprising a housing wall and a receiving opening, wherein the receiving opening is delimited circumferentially by a free rim section of the housing wall, wherein through the receiving opening an air filter element, provided with a circumferentially extending elastomeric radial sealing element, is insertable into the housing pot;
   a housing cover configured to be placed along a mounting axis onto the housing pot;
   wherein the radial sealing element of the air filter element, when the air filter element is inserted into the housing pot, projects in a radial direction past the free rim section in an outward direction and seals the housing cover and the housing pot relative to each other;
   wherein the housing wall and the free rim area circumferentially surround the receiving opening of the housing pot;
   wherein the housing pot comprises:
      a circumferentially extending collar formed on and projecting radially outwardly from an exterior surface of the housing wall of the housing pot and surrounding the receiving opening; and
      a plurality of stop ribs formed on and projecting radially outwardly from the exterior surface of the housing wall, the plurality of stop ribs projecting axially outwardly away from the circumferentially extending collar towards the receiving opening;
      wherein the plurality of stop ribs are circumferentially spaced apart about the circumferentially extending collar, and are positioned to contact against an axial side of the radial sealing element of the filter element, such that the radial sealing element of the filter element is spaced axially away from the circumferentially extending collar by the plurality of stop ribs so as to support the radial sealing element on the housing pot in an axial direction;
   wherein the plurality of stop ribs limits an axially oriented deformation of the radial sealing element relative to the free rim section of the housing wall when the housing cover is placed onto the housing pot.

2. The air filter housing according to claim 1, wherein the plurality of stop ribs is integrally formed on the housing pot.

3. The air filter housing according to claim 1, wherein the housing pot has a polygonal shape with housing corners,
   wherein the plurality of stop ribs is correlated with one of the housing corners.

4. The air filter housing according to claim 1, wherein the plurality of stop ribs is at least partially rounded.

5. The air filter housing according to claim 1, wherein the plurality of stop ribs are arranged spaced apart from each other in a circumferential direction of the housing pot.

6. The air filter housing according to claim 1, wherein the housing pot has a polygonal shape with housing corners, wherein the plurality of stop ribs are correlated with at least two of the housing corners.

7. The air filter housing according to claim 6, wherein the at least two housing corners are arranged opposite each other.

8. The air filter housing according to claim 1, wherein the housing pot is formed of thermoplastic material.

9. The air filter housing according to claim 1, wherein the housing cover is formed of thermoplastic material.

10. The air filter housing according to claim 1, wherein the housing pot and the housing cover are formed of thermoplastic material.

11. An air filter for an air intake conduit of an internal combustion engine of a motor vehicle, the air filter comprising:

an air filter housing comprising a housing pot comprising a housing wall and a receiving opening, wherein the receiving opening is delimited circumferentially by a free rim section of the housing wall, and further comprising a housing cover configured to be placed along a mounting axis onto the housing pot;

an air filter element, provided with a circumferentially extending elastomeric radial sealing element, insertable into the housing pot through the receiving opening;

wherein the radial sealing element of the air filter element, when the air filter element is inserted into the housing pot, projects in a radial direction past the free rim section in an outward direction and seals the housing cover and the housing pot relative to each other, wherein the radial sealing element extends into a sealing gap disposed between the housing pot and the housing cover;

wherein the housing pot comprises:

a circumferentially extending collar formed on and projecting radially outwardly from an exterior surface of the housing wall of the housing pot and surrounding the receiving opening; and a plurality of stop ribs formed on and projecting radially outwardly from the exterior surface of the housing wall, the plurality of stop ribs projecting axially outwardly away from the circumferentially extending collar towards the receiving opening;

wherein the plurality of stop ribs are circumferentially spaced apart about the circumferentially extending collar, and are positioned to contact against an axial side of the radial sealing element of the filter element, such that the radial sealing element of the filter element is spaced axially away from the circumferentially extending collar by the plurality of stop ribs so as to support the radial sealing element on the housing pot in an axial direction;

wherein the plurality of stop ribs limits an axially oriented deformation of the radial sealing element relative to the free rim section of the housing wall when the housing cover is placed onto the housing pot.

* * * * *